UNITED STATES PATENT OFFICE.

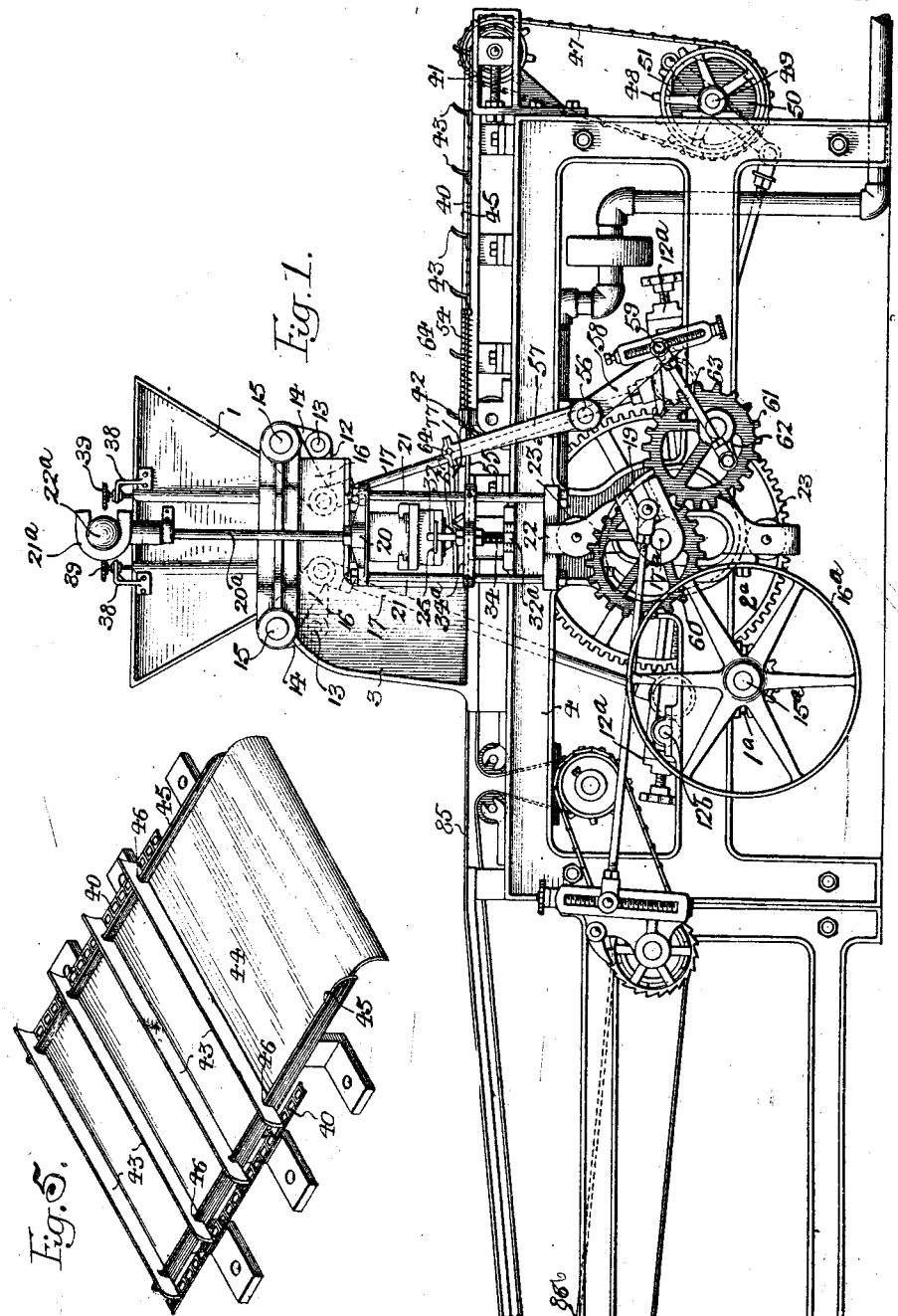
P. D. HARTON.
MACHINE FOR ICING OR COATING CAKES.
APPLICATION FILED OCT. 7, 1909.
1,036,108.
Patented Aug. 20, 1912.
5 SHEETS—SHEET 1.
Inventor—
Pembroke D. Harton.
by his Attorneys.
Howson & Howson
Witnesses:—
Titus H. Irons
Willa A. Burrowes

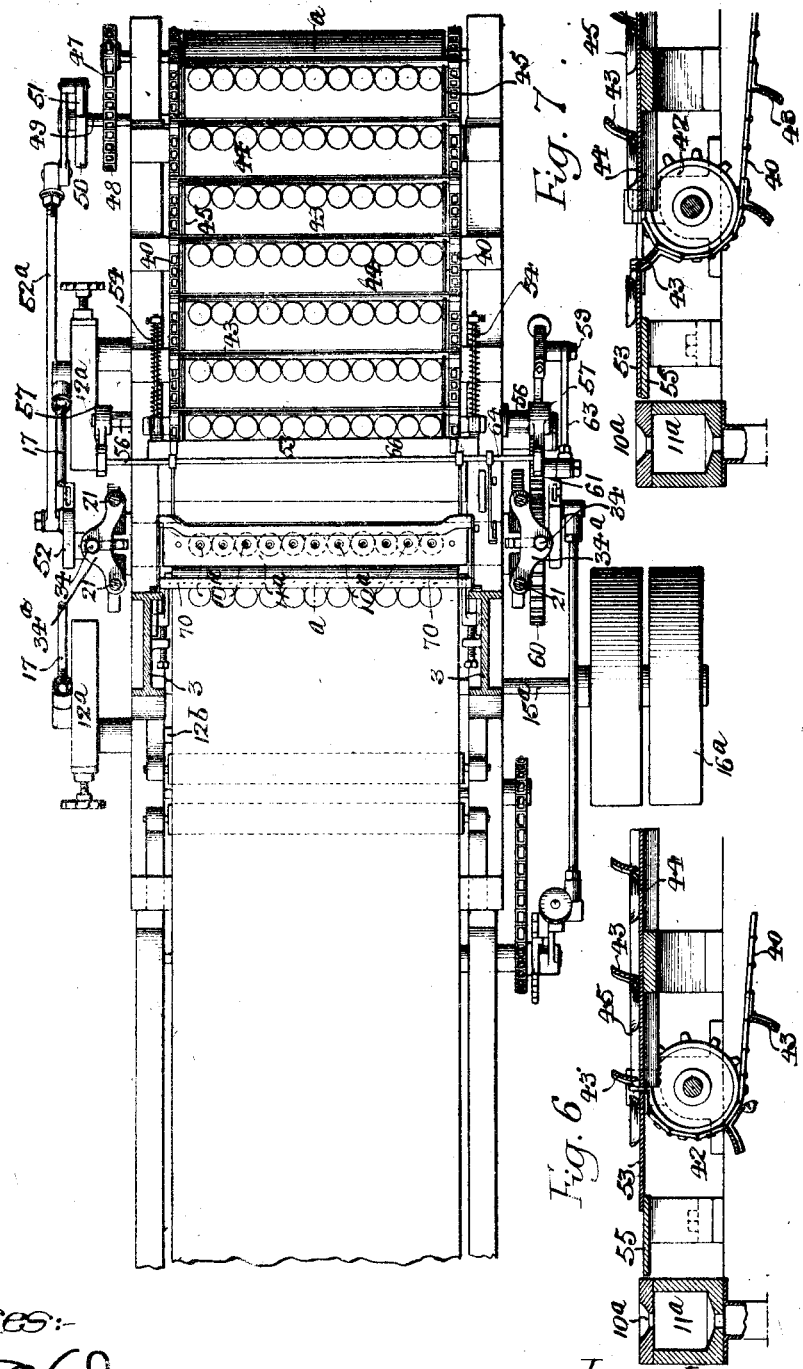

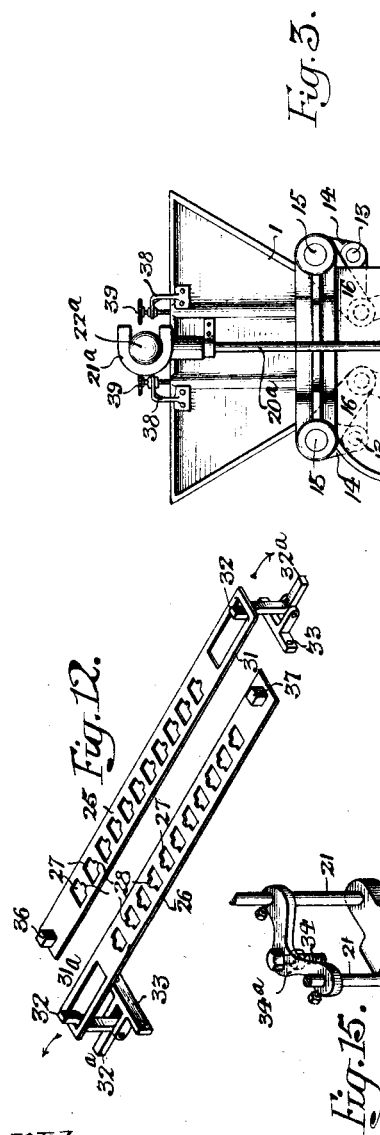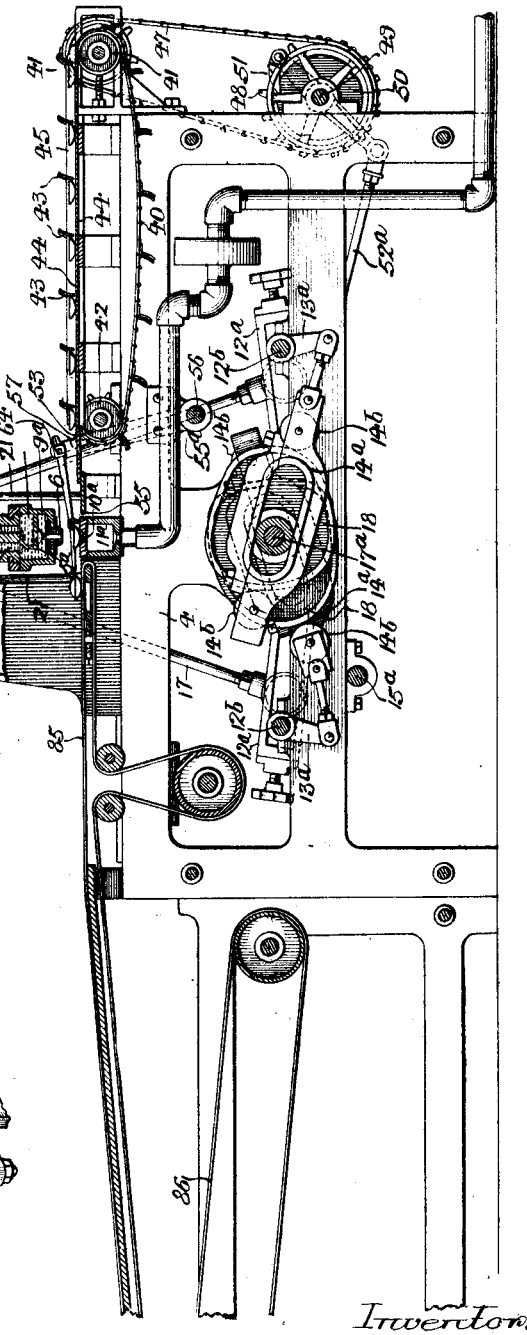

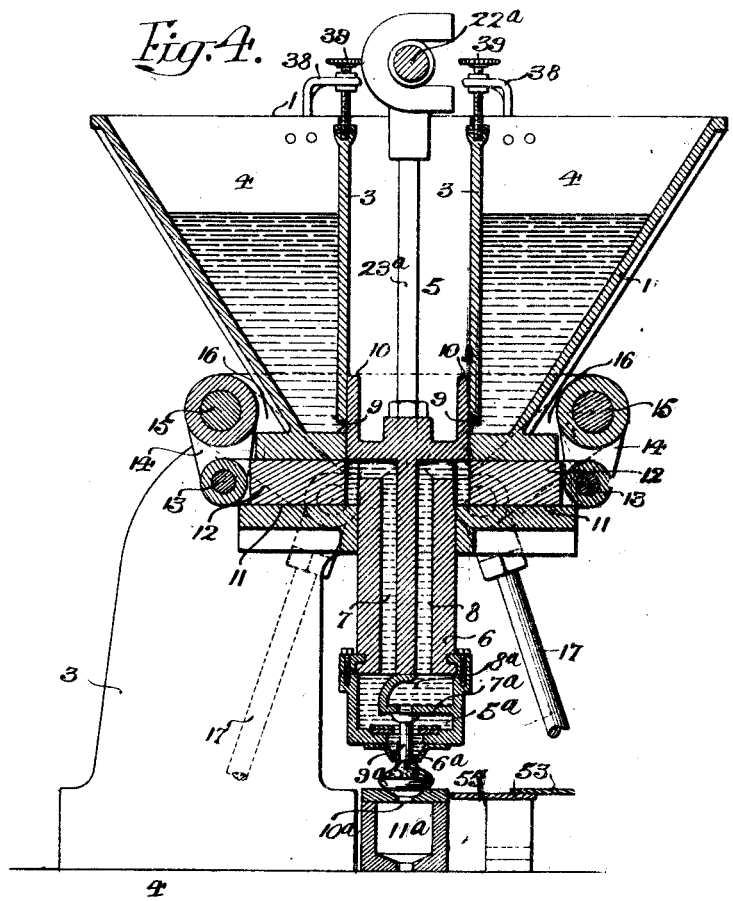

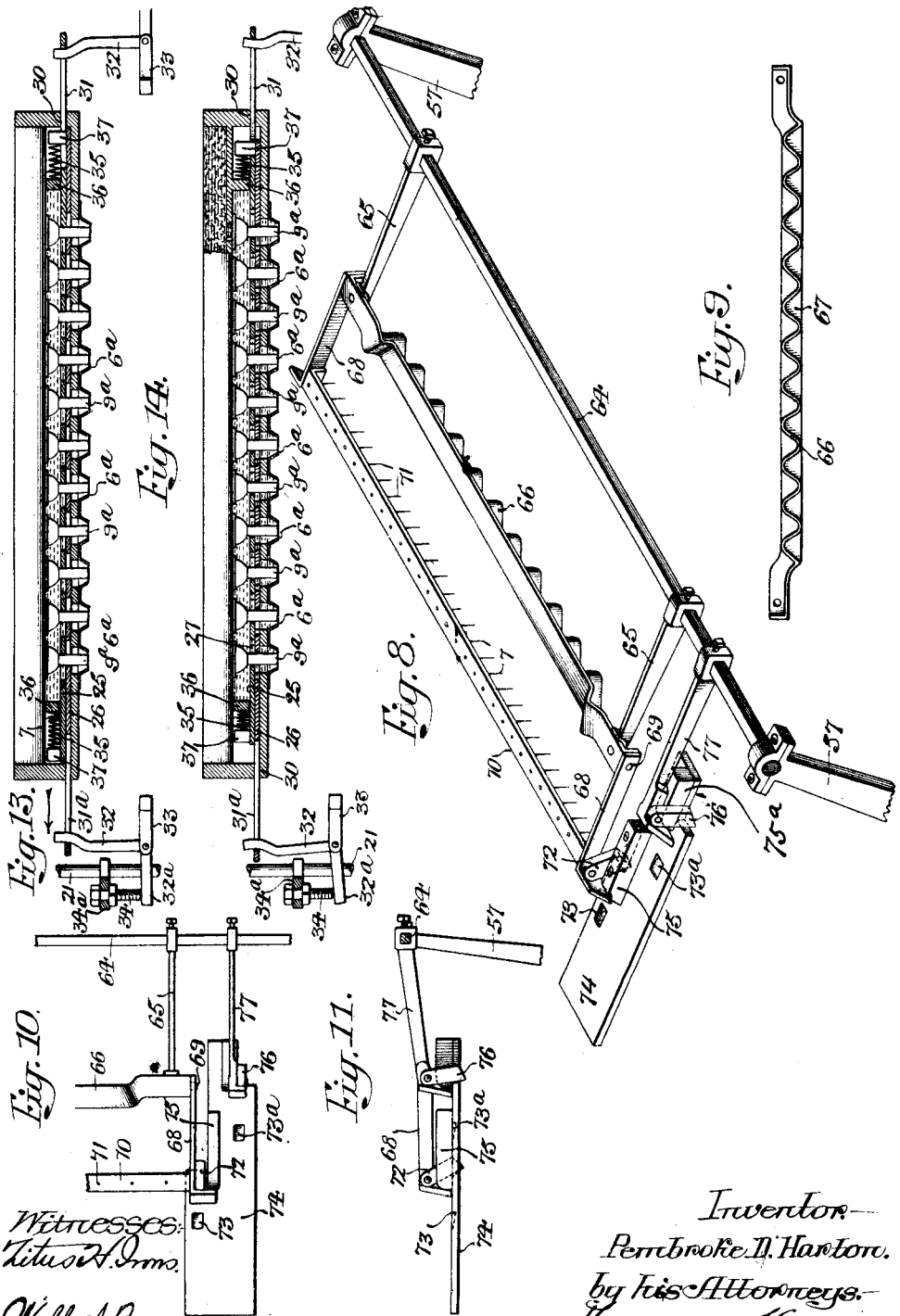

PEMBROKE D. HARTON, OF PHILADELPHIA, PENNSYLVANIA.

MACHINE FOR ICING OR COATING CAKES.

1,036,108.  Specification of Letters Patent.  Patented Aug. 20, 1912.

Application filed October 7, 1909. Serial No. 521,501.

*To all whom it may concern:*

Be it known that I, PEMBROKE D. HARTON, a citizen of the United States, residing in Philadelphia, Pennsylvania, have invented certain Improvements in Machines for Icing or Coating Cakes, of which the following is a specification.

My invention relates to mechanical means for the icing and coating of cakes; and the object of my invention is to provide mechanism of the general character shown and described in my pending application filed August 17, 1908, Serial No. 448,840, with means for applying or depositing upon cakes coating materials such as soft dough, macaroon, melted fondant, chocolate, marshmallow paste, fig paste and the like; the depositing means being designed to deposit one or more kinds of material upon the same cake and in some instances to deposit combined mixtures of such materials upon the cake.

A further object of my invention is to provide improved means for feeding coating material to the cakes, to provide for automatically cutting off the discharge of either one or both of the coating materials when more than one is used; and a still further object of my invention is to facilitate the removal of the iced cakes and the simultaneous positioning of a fresh supply of cakes to receive the desired coating.

In the accompanying drawings: Figure 1, is a side elevation of a cake coating machine embodying my invention; Fig. 2, is a plan view of the same; Fig. 3, is an elevation similar to that shown in Fig. 1, partly in section, on the line *a—a*, Fig. 2; Fig. 4, is a sectional view of the hopper containing the coating material or materials and the feed device for delivering the same to the cakes; Fig. 5, is a perspective view of the feed table upon which the cakes are placed, and the conveying means coacting therewith; Figs. 6 and 7, are sectional views illustrating the manner in which the cakes are moved by the conveying means to a point adjacent the suction box; Fig. 8, is a perspective view of the reciprocating device for moving a row of the cakes after they have been coated and for simultaneously placing a row of uncoated cakes in position to receive the coating material; Fig. 9, is an inverted plan view of the bar for positioning the uncoated cakes; Fig. 10, is a plan view of one end of the reciprocating device for positioning the uncoated and removing the coated cakes; Fig. 11, is an end elevation of the part of the structure shown in Fig. 10; Fig. 12, is a detached perspective view of parts forming a cut-off device or valve to control the feed of one of the coating materials; Figs. 13 and 14, are sectional views illustrating the cut-off device or valve shown in Fig. 12, in its place in the feed hopper, such cut-off device being shown in the closed and open positions, respectively; Fig. 15, is a detached perspective view illustrating part of the mechanism for operating the cut-off device or valve, and Fig. 16, is a sectional view of the lower part of the feed device for applying the coating material to the cakes showing certain modifications embodying my invention.

In my present apparatus, I employ a vacuum or suction box to maintain the cakes in position to receive the coating material; such box being recessed on its upper surface to receive the cakes, with apertures affording proper communication between such recesses and the interior of the suction box. This box is substantially similar to the device shown in my pending application before referred to, and may be connected to any suitable suction apparatus, exhaust fan, or the like.

In the drawings, 1 represents a hopper to receive the coating material, and this hopper is divided by partition plates 3 into two compartments 4. Between the partition plates 3 a space 5 is provided for movement of a feed device 6 which carries the nozzles or other discharge devices through which the coating material is ejected onto the cakes. The hoppers may contain the same or different materials, and their bottoms communicate with channels or chambers 7, and 8 in the feed device through outlets 9 when said feed device is in the raised position; the upper portion 10 of said feed device cutting off the flow through the outlets 9 when said feed device is in the lowered position. Arranged to move in suitable chambers 11 formed in the hopper casting below the compartments 4 of the same are pistons 12, connected at 13 to arms 14 carried by rock shafts 15; the latter having other arms 16 connected to rods 17 which are operated by suitable cams carried by the main driving shaft of the machine. Upon the lowering of the feed device, the material in the channels or chambers 7 and 8 within the same is carried down and the wall of the upper portion 10 closes the communication of the material in the hoppers with that in the feed chambers. As in my prior application, the lowering of the feed device is timed to take place when the cakes are in position over the suction box, and suitable mechanism is employed to effect this action. Simultaneously with the arrival of the feed nozzles at their position of discharge over the cakes, the pistons complete their inward movement and such material is extruded through the nozzles onto said cakes.

The discharge end of the feed device delivering the material through suitable openings or nozzles, which coating material may be of one or two kinds, operates in a manner somewhat similar to that described and shown in my pending application, but I have found in attempting to discharge the material from the nozzles that there is more or less difficulty in cutting off the flow of material from the same, particularly that from the larger or outer nozzle, when two are used; the amount discharging from the same being usually much greater than that coming from the central feed tube.

As shown in the drawings, the delivery end of the feed device has a chamber $5^a$; the lower wall of which is suitably apertured, and provided with nozzles $6^a$ registering with said apertures. Within said discharge end of the feed device is a wall or diaphragm $7^a$, forming another chamber $8^a$, which wall is apertured and carries nozzles $9^a$ centrally disposed with respect to the nozzles $6^a$. These nozzles are mounted directly above apertures $10^a$ formed in the suction box, which is indicated at $11^a$, so that when the cakes have been positioned on said suction box they are ready to receive the coating material.

The feed device is vertically movable so as to bring the nozzles close to the cakes when they are to be coated, and movement is imparted to this structure in the following manner: The main driving shaft of the machine is indicated at $15^a$, suitably journaled in the frame of the machine and having a pulley $16^a$, whereby movement may be imparted to said shaft by means of a belt from a suitable source of power, (not shown). The frame also carries a cam shaft $17^a$ suitably journaled and carrying a series of cams 18 and 19; said cam shaft being actuated from the driving shaft by a pinion $1^a$ and gear wheel $2^a$. The cams 18 control the operation of the rock shafts 15 for maintaining a supply of coating material in the feed device of the hopper, while the cams 19 control the movement of said feed device. This portion of the hopper is carried by cross bars 20, each having rods 21 whereby said cross-bars may be connected to pitmen 22 having rollers 23 engaging the cams 19 from opposite sides. The yokes 20 carry rods $20^a$ suitably guided at the sides of the hopper and having hooked upper ends $21^a$ engaging a cross bar $22^a$ from which the feed device is suspended by rods $23^a$ disposed in the space 5 of the hopper. These cams are so constructed and timed that the feed device will be lowered to deposit material upon the cakes immediately after they have moved into position over the apertures in the suction box and held by the suction.

The pistons 12 which serve to deliver material from the compartments 4 of the hopper to the chambers or channels 7 and 8 of the feed device are operated from rock shafts 15 through the medium of crank arms 14; said rock shafts being actuated through the medium of crank shafts 16 operated by the rods 17. The rods 17 are connected by suitable adjustable crank arms $12^a$ to rock shafts $12^b$ journaled in the frame of the machine; said rock shafts having crank arms $13^a$ connected to pitmen $14^a$ having rollers $14^b$ engaging the cams 18 from opposite sides of the same; such cams and connections referred to being timed so that material will be fed to the chambers or channels 7 and 8 of the feed device at the proper moment when the latter is lowered to insure proper discharge upon the cakes, and retracting the pistons at the time the feed device is raised so as to break the connection between the material on the cakes and that within said feed device.

The discharge of material from the nozzles $9^a$ is relatively uncontrolled so that at every vertical movement of the feed device, the material from the channel or chamber 8 of the same will be discharged through said nozzles. The nozzles $9^a$ are relatively small and the flow of coating material through the same is relatively slight, and as soon as the feed device of the hopper is raised the material in said nozzles will break away from that on the cakes; the latter being firmly held by suction to permit such action. The feed to the other nozzles $6^a$, however, may be controlled by a cut-off device or valve, comprising sliding plates 25 and 26 suitably apertured at 27 with such apertures recessed at 28 to fit around the tubes forming the nozzles $9^a$, in order that the delivery of coating material to the nozzles $6^a$ may be cut off completely when the feed device rises, to effect a quick break between the material on the cakes and that in the nozzles. Upon raising the feed device, the coating material may flow into the space between the plates 3 and the outer walls of the channels or chambers 7 and 8, through the outlets 9, and then when the feed device reaches the lower position the pistons 12 will be actuated to exert pressure upon the coating material in said channels or chambers and cause the same to extrude onto the cakes. Immediately the feed device starts to rise after the coating material has contacted with the cakes, the pistons are retracted, causing the coating materials to be drawn up and assisting if not actually effecting the separation between the material extruding from the nozzles and that deposited on the cakes. This condition is assisted by reason of the fact that full suction is on to retain the cakes to the suction box until the icing connection is broken.

The cut-off device for the nozzles 6ᵃ may be operated by the following means: The end walls of the discharge end of the feed device are apertured at 30 for the passage of projecting ends 31 and 31ᵃ of the plates 25 and 26, as clearly indicated in Figs. 13 and 14; the end of one plate projecting at one side of the hopper while the end of the other plate projects at the other side of the hopper. Movement may be imparted to these plates by means of bell-crank levers 32, pivotally mounted in brackets 33 carried by the side frames of the machine, and the ends 32ᵃ of these levers are engaged by adjustable members 34 mounted in cross-bars 34ᵃ carried by the rods 21 supporting the feed device so that when the latter is in the proper position to deliver the material, the bell-crank levers will operate said sliding plates 25 and 26 and open the same to the position shown in Fig. 14. When the feed device is raised, the valve plates will be moved back and held in the closed position by means of springs 35 interposed between lugs 36 carried by the bottom wall of the feed chamber and stops 37 carried by said plates, as shown in Fig. 13. In some instances I may omit the cut-off device, and control the discharge of the coating material or materials entirely by the pistons 12.

The partition plates 3 are vertically adjustable in the hopper; the latter having brackets 38 adapted to receive set screws 39, which screws may be connected to said plates so that by turning said screws the plates may be raised and lowered to regulate the size of the outlets 9 leading from the hoppers 4.

The means for feeding the cakes comprise chains 40 passing over and driven by suitable chain wheels 41 and 42, which chains may be actuated at intervals to traverse the cakes, and carry blades 43 adapted to move the cakes across a table or platform 44. This platform has raised sides 45, and the blades 43 are notched at 46 so as to accommodate said sides. The feed chains may be driven by a step-by-step movement, imparted thereto from a chain and chain wheel 47 and 48, carried by a shaft 49; the chain wheel 48 being coupled to a ratchet wheel 50 moved by a pawl 51 which receives its movement from a crank 52 mounted on the cam shaft 17ᵃ through the medium of a connecting rod 52ᵃ.

As the cakes are fed forward by the blades 43 of the chains 40 they are finally brought to a point where they must leave the fed table 44 and pass onto a movable platform 53 disposed between the end of the table or platform 44 and the suction box 11ᵃ. This platform is held in the retracted position illustrated in Figs. 2 and 6, by means of springs 54, and is moved by the blades 43 against the tension of these springs as clearly shown in Fig. 7. The frame of the machine carries a fixed shelf or support 55 upon which the movable platform slides, such support also serving to close the gap between the table 44 and the suction box.

By having a movable platform 53 onto which the cakes may be moved by the blades 43, provision is made for closing the gap between the feed table 44 and the shelf 55, and at the same time the cakes may be advanced and said blades may pass around the chain wheels. The blades push the moving platform out of the way and cause it to carry the cakes toward the suction box and into position to be engaged by the guiding pusher whereby they may be placed in proper position on said suction box. The platform is retracted by the springs 54 immediately it is released by the blades 43 passing under the same.

Journaled in suitable bearings 55ᵃ carried by the frame of the machine, is a shaft 56 carrying arms 57. On one side of the machine one of these arms is extended at 58 and is connected at 59 to suitable operating means: in the present instance a pair of eccentric sprocket wheels 60 and 61 being provided, one of which carries a crank 62 with a link 63 connected to the part 58 of said lever. A squared shaft 64 is suitably journaled in the ends of said arms 57, and carried by said shaft are a pair of arms 65 having a guiding or centering pusher for the cakes to be coated, which pusher is indicated at 66. The purpose of the pusher is to center the cakes over the apertures 10ᵃ in the top of the suction box 11ᵃ, and to this end it is provided with a recessed edge or face 67 adapted to partially fit the curved edges of the cakes and push them forward in a substantially regular line so that they may register with the apertures of the suction box. In addition, the pusher 66 carries arms 68 pivoted to the ends of the same at 69, and having a rake comprising a bar 70 connected to the ends of said arms 68 and having pins or teeth 71. This rake is disposed in advance of the pusher 66 so that the coated cakes may be pushed out of the way as the uncoated cakes are brought into position to receive the coating material.

On the forward movement, in engagement with the coated and uncoated cakes, the pusher and rake are just out of contact with the surface of the platform or table behind the suction box, but on the return movement they must be elevated in order to pass over the cakes. For this purpose I make use of means somewhat like that shown and described in my Patent No. 939,836, dated Nov. 9, 1909, but having special improvements differing from the prior structure. When retracting the pusher 66 and rake 70 for the purpose of engaging fresh rows of cakes, these members have a tendency to ride close to the surface of the table or platform over which the cakes are to be moved, and this tendency is particularly possible with the rake 70 as it is carried by arms 68 pivoted at 69 to the pusher 66. I therefore provide first, means to partially raise the rake, and second, means for raising the pusher 66 and rake 70 over the rows of uncoated and coated cakes they are to engage and move away from the suction box. The first means comprise a latch 72 pivoted to the end of the arm 68 which, on the retractive movement of the rake 70, engages a recess 73 formed in the slide plate 74 carried at the side of the machine frame, and such engagement shifts the position of said latch; elevating the rake. Upon the further retractive movement of said rake and pusher, the projecting ends of the arms 68 and 77 engage and ride over blocks 75 and 75ª carried by said plate 74, and the rake 70 and pusher 66 are raised still higher; the former so as to clear the row of uncoated cakes which have been positioned over the suction box by the pusher 66, and the latter so as to clear the next row of cakes which are to be moved forward thereby to the coating position. A latch or finger 76 similar to that shown at 72 is also pivotally mounted on an arm 77 carried by the squared shaft 64. Upon the return movement of the pushing members the fingers or latches 72 and 76 engage recesses 73 and 73ª in the plate 74 at the side of the machine frame which engagement causes them to turn on their pivots and lift the pushing members, being tilted slightly forward against a part of the arm so as to avoid accidental falling. When fully retracted, the pusher and rake are relieved of the support afforded by said latches as the latter drop over the rear end of the plate 74, said pusher and rake being then in position behind two rows of cakes, the one coated and the other uncoated and upon the forward movement of said rake and pusher, the row of coated cakes is moved from beneath the feed device and the row of uncoated cakes is moved into position to take its place.

As noted, the moving shelf is pushed forward as the row of cakes is delivered to the same by the blades 43 of the chain 40 whose movement is intermittent, and when one of these blades has done this work the movement of this chain 40 stops and the blade passing the top surface of the said plate is arrested against the front edge of the plate which is wide enough to permit engagement by the blade. The plate 53 is thus held by the chain during its period of quiescence. During the time the plate 53 is maintained adjacent the suction box, the pusher 66 has been retracted to engage and move the row of cakes onto the suction box; this part of the mechanism being so timed that as soon as the row of cakes leaves said plate 53, the chain has started to move; releasing the blade from engagement with the plate 53, and the latter is restored to its normal position adjacent the table 44 by means of the springs 54 ready to receive the next row of cakes.

In lieu of the concentric arrangement of independent nozzles, as illustrated in Figs. 1 and 4, I may employ the arrangement shown in Fig. 16, in which a plate 80 with a number of outlets 81 is secured to the under side of the discharge end of the feed device; such outlets communicating with one channel or chamber of the latter, while the other channel or chamber has a tube 82, taking the place of the central nozzle of the other construction, which tube registers with the central aperture of the plate, and by this means I am able to provide for the discharge of material from a number of points and effect coating of cakes in a pleasing manner. Other forms of apertured plates may be employed.

When the cakes are coated, they may be delivered to suitable receiving belts 85, and from these they may be delivered to boards or trays carried by a belt 86 in the manner illustrated in my prior application.

I claim:

1. In a cake coating machine and in combination with means for feeding cakes to a coating point and suction means for holding the same at such point, a plurality of sets of concentrically arranged depositing elements having their discharge outlets in the same plane for simultaneously depositing a plurality of coating bodies on said cakes, and a plurality of horizontally disposed valves movable in opposite directions for cutting off the flow of one of said coating bodies without affecting the flow of the other.

2. In a cake coating machine, the combination of a material receptacle having a feed chamber, a plurality of outlets leading from said feed chamber, said outlets having depositing elements with concentrically arranged outlets in the same plane for the delivery of two bodies of coating material simultaneously, and a plurality of automatically operating horizontally disposed valves movable in opposite directions for cutting off the flow of one of said bodies of coating material.

3. In a cake coating machine, the combination of cake feeding means, a material receptacle having a feed chamber with a plurality of pairs of outlets concentrically arranged leading from said receptacle for discharging two kinds of coating material simultaneously upon said cakes, a pair of sliding plates disposed in the material receptacle adjacent said outlets, said plates coacting and forming valves to cut off the flow of one body of such material, and means at the ends of the feed chamber for actuating said plates.

4. In a cake coating machine, the combination of a feeding belt for the cakes, a table receiving the cakes therefrom, a pusher arm engaging said cakes after they have been delivered by the feeding belt, said pusher arm acting in line with the direction of movement of the feeding belt and having a recessed engaging portion to guide and center the cakes, and means for retracting and simultaneously lifting said pusher arm for engagement with a fresh row of cakes.

5. The combination, in a cake coating machine, of means for depositing coating material upon said cakes, a feed belt for the cakes, means arranged to move the cakes from said feed belt and deliver them to the coating point, said means being also designed to remove the coated cakes from one position and bring the uncoated cakes into position to be coated and including a bar with its engaging face recessed in order to guide the cakes, and means for raising said pusher arms whereby they may pass over the cakes when retracted for fresh engagement with the latter.

6. In a cake coating machine and in combination with means for feeding cakes and suction means for holding the same at a coating point, a hopper having a plurality of chambers for coating material to be deposited upon said cakes, depositing devices for such material, a feed device delivering said coating materials from said chamber to the depositing devices, said feed device being vertically movable between the chambers carrying the coating materials, and means for raising and lowering said feed device, material from the chambers of the hopper passing to said feed device when it is in the raised position.

7. In a cake coating machine, the combination of a material receptacle having a pair of chambers with independent outlets, a vertically movable feed device disposed between said chambers and having a plurality of outlets leading therefrom, said feed device having a plurality of passages communicating at one end with the material containing chambers and at the opposite end with said outlets, means concentrically arranged for the delivery of two bodies of coating material simultaneously from said feed device, the discharge openings therefor being in the same plane, a plurality of horizontally movable valves, and means for operating said valves in opposite directions whereby the flow of one of said bodies of coating material may be automatically cut off.

8. In a cake coating machine, the combination of a chain for feeding the cakes, a movable platform onto which said cakes are moved, said platform being moved by the chain, and a pusher arm for engaging said cakes after they have been delivered to the movable platform, said pusher arm being recessed to guide and center the cakes.

9. The combination, in a cake coating machine, of means for depositing coating material upon a row of cakes, means for feeding the cakes to a movable platform, means arranged to move the cakes from said platform and deliver them to the coating point, said means being also designed to remove the coated cakes from one position and bring the uncoated cakes into position to be coated and including a bar with its engaging face recessed in order to guide the cakes, and means for raising said cake moving elements whereby they may pass over the cakes when retracted for fresh engagement with the latter and be dropped behind the next row of cakes to be engaged.

10. In a cake coating machine, a feed table, a chain having blades for engagement with the cakes, a movable platform onto which the cakes are moved by said blades, said platform being pushed out of the way by the blades, and means for retracting said platform to receive the cakes delivered by the blades, the forward movement of the platform permitting the blades to pass with the chain around the chain wheels.

11. In a cake coating machine, the combination of a pusher arm, a reciprocating member carrying the same, a supplemental rake mounted in advance of said pusher arm, said rake being pivotally carried by the pusher arm, a latch at the end of said rake for raising the same, means for moving said latch to effect elevation of the rake, a latch carried by the reciprocating means for the pusher, and means for changing the position of said latch to elevate the pusher simultaneously with the elevation of the rake.

12. The combination, in a cake coating machine, of reciprocating means for moving the cakes comprising a pusher for the uncoated cakes and a pusher for the coated cakes, means for elevating said pushers upon the retractive movement of the same to one height, and supplemental means for raising said pushers to a higher point to clear the rows of uncoated cakes.

13. In a cake coating machine, the combination of a feed table, a bladed chain for moving cakes across the same, a movable plate onto which the cakes are fed, said plate being advanced and held by one of said blades, and means for moving the cakes from said plate, the latter being released upon further movement of said chain.

14. In a cake coating machine, the combination of a feed table, a bladed chain for moving cakes across the same, means for imparting intermittent movement to said chain, a movable plate onto which the cakes are fed, said plate being advanced and held by one of said blades, means for moving the cakes from said plate, the latter being released upon further movement of said chain, and means for retracting said plate.

15. In a cake coating machine, the combination of a feed table, a chain for moving cakes across the same, a movable plate onto which the cakes are fed, said plate being moved forward by the chain, means for moving the cakes from said plate after the latter has been moved forward, and means for retracting and simultaneously lifting the cake moving means.

16. The combination, in a cake coating machine, of reciprocating means for moving the cakes comprising a plurality of pusher arms, means for moving said arms forward and back, means for elevating said pushers upon the retractive movement of the same to one height, and supplemental means for raising said pushers to a higher point before completing the retractive movement.

17. The combination, in a cake coating machine, of reciprocating means for moving the cakes forward comprising a plurality of pusher arms, means for actuating said arms forward and back, latches carried by said arms, cams engaging said latches to raise the arms upon the retractive movement of the same, one of said cams acting to raise the arms to one height during a portion of the retractive movement and the other cam acting to raise the arms to a higher point before completing the retractive movement.

18. In a cake coating machine, a feed table, movable blades for engaging and moving the cakes, a movable platform receiving the cakes delivered by the blades, said platform being pushed out of the way by the blades, and means for moving the cakes from said movable platform.

19. In a cake coating machine, the combination of a feed table, movable blades for moving cakes across the same, a movable plate onto which the cakes are fed, said plate being advanced and held successively by the blades, and means for moving the cakes from said plate, the latter being released upon further movement of said blade.

20. In a cake coating machine, the combination of a hollow bed plate having apertures over which cakes may be centered, suction means connected to said hollow bed plate for retaining the cakes in place, a fixed table, cake moving means, a movable table disposed between the fixed table and the hollow bed plate, said feeding means delivering the cakes upon the movable table and shifting said movable table toward the bed plate, means for moving the cakes from the movable table onto said bed plate, and means for retracting said movable table.

In testimony whereof, I have signed my name to this specification, in the presence of two subscribing witnesses.

PEMBROKE D. HARTON.

Witnesses:
MURRAY C. BOYER,
WM. A. BARR.